United States Patent [19]
Kroeger et al.

[11] 4,344,056
[45] Aug. 10, 1982

[54] ELECTROMAGNET WITH REPLACEABLE FRICTION FACE

[75] Inventors: Edward R. Kroeger; Philip E. Myers, both of Beloit, Wis.

[73] Assignee: Warner Electric Brake & Clutch Company, South Beloit, Ill.

[21] Appl. No.: 174,213

[22] Filed: Jul. 31, 1980

[51] Int. Cl.³ .............................................. H01F 7/06
[52] U.S. Cl. .................................... 335/219; 335/266; 310/77; 188/138
[58] Field of Search ............... 335/289, 219, 209, 266, 335/272, 279, 278, 281; 310/77; 188/164, 138, 250 B

[56] References Cited
U.S. PATENT DOCUMENTS

| | | | |
|---|---|---|---|
| 2,695,687 | 11/1954 | Anderson | 188/164 |
| 3,668,445 | 6/1972 | Grove | 310/77 |
| 4,172,242 | 10/1979 | Myers et al. | 335/209 |
| 4,216,849 | 8/1980 | Neill | 188/138 |

Primary Examiner—L. T. Hix
Assistant Examiner—S. D. Schreyer
Attorney, Agent, or Firm—Leydig, Voit, Osann, Mayer & Holt, Ltd.

[57] ABSTRACT

The friction face of an electromagnet is formed by a relatively thin sheet of friction material and by magnetic inserts which are secured to the friction material and which define the pole faces of the magnet. The friction face is adapted to be easily removed from the magnet and replaced with a new friction face when the friction face becomes worn.

12 Claims, 6 Drawing Figures

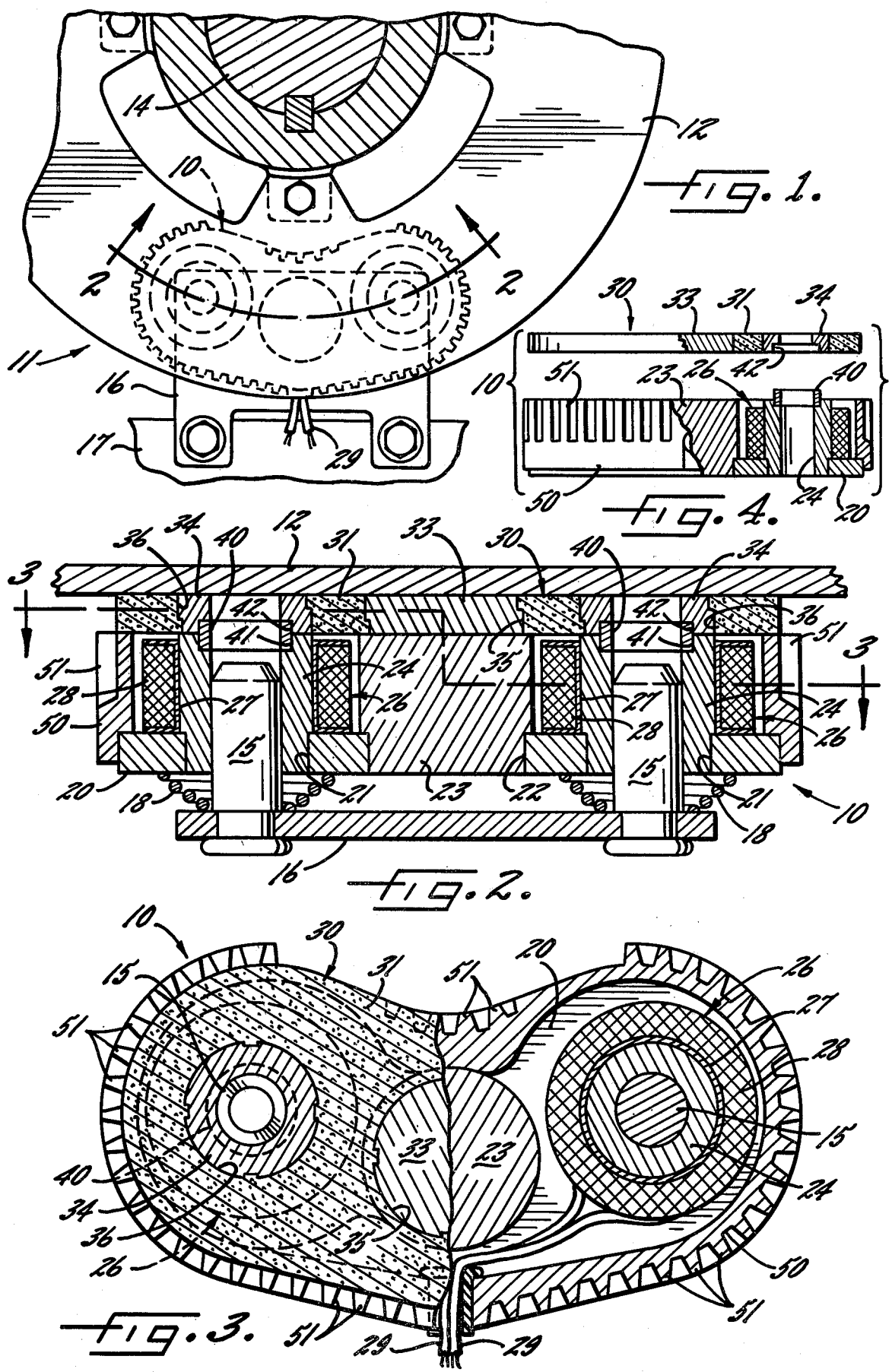

ELECTROMAGNET WITH REPLACEABLE FRICTION FACE

BACKGROUND OF THE INVENTION

This invention relates to an electromagnet for use with an electrically controlled brake. More specifically, the invention relates to an electromagnet of the same general type as disclosed in Myers et al U.S. Pat. No. 4,172,242. That magnet includes a plate stamped from magnetic sheet metal and further includes at least one pole which is defined by a stud adapted to be formed from inexpensive bar stock and adapted to be easily assembled with the stamped plate.

An electrical coil surrounds the stud and, when the coil is energized, the poles of the magnet are attracted toward an armature and frictionally retard the armature. The primary friction face of the magnet is formed by a piece of friction material which fills the spaces between the poles. In the magnet disclosed in the Myers et al patent, the friction material is in the form of a rather thick block whose outer active face is substantially flush with the outer end of the stud.

While the magnet of the Myers et al patent lends itself to being manufactured in a comparatively economical manner, the thick block of friction material is relatively expensive. Also, it is necessary to replace the entire electromagnet once the poles and the active face of the friction block have experienced excessive wear.

SUMMARY OF THE INVENTION

The general aim of the present invention is to provide a new and improved electromagnet which possesses most of the advantages of the prior Myers et al magnet but which includes a friction face adapted to be easily removed and replaced and which, at the same time, enables a smaller volume of friction material to be used when a friction face of a given area is required.

A more detailed object of the invention is to achieve the foregoing by providing an electromagnet in which the friction face is uniquely formed by a relatively thin sheet of friction material having inserts made of magnetic material and forming the active pole faces of the magnet. The entire friction face (i.e., the friction material and the inserts) may be easily removed and replaced when wear occurs.

Another object is to provide an electromagnet whose poles and friction face may be easily and inexpensively ground to form the poles and the friction face with flat and parallel surfaces.

Still another object of the invention is to provide an electromagnet in which the heat insulating capability of the friction material is reduced and in which the electrical coil is uniquely surrounded by a heat radiating housing which dissipates heat from the coil.

The invention also resides in the provision of a novel friction face having magnetic poles which are joined to a sheet of friction material and which are magnetically isolated from one another by the friction material itself.

These and other objects and advantages of the invention will become more apparent from the following description when taken in conjunction with the accompanying drawings.

BRIEF DESCRIPTION OF THE DRAWINGS

FIG. 1 is a front elevational view of one embodiment of a new and improved electromagnet incorporating the unique features of the present invention and shows the magnet being used to brake an armature.

FIG. 2 is an enlarged fragmentary cross-section taken substantially along the line 2—2 of FIG. 1.

FIG. 3 is a cross-section taken substantially along the line 3—3 of FIG. 2.

FIG. 4 is a side elevational view of the magnet with certain parts being broken away and shown in section and with the friction face being shown separated from the rest of the magnet.

DETAILED DESCRIPTION OF THE PREFERRED EMBODIMENTS

Figure 5:
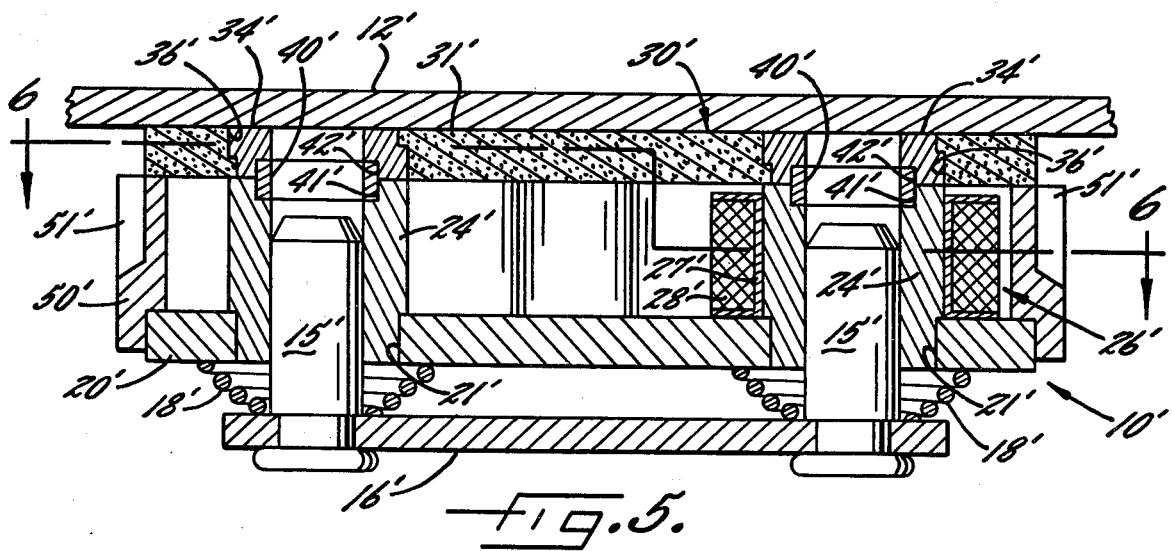
FIG. 5 is a view similar to FIG. 2 but shows another embodiment of a magnet incorporating the features of the invention.

As shown in the drawings for purposes of illustration, the invention is embodied in an electromagnet 10 which forms part of a brake 11. The brake further includes a disc-like armature 12 which is made of steel and which is adapted to be rotated by a power-driven shaft 14. When energized, the electromagnet 10 frictionally engages and retards the armature 12. In this particular instance, the brake 11 is a tension brake of the type which is used in textile machines. When the magnet 10 is energized, it does not completely stop the armature but instead applies a retarding force thereto to control the motion of the shaft 14.

The electromagnet 10 is mounted on a pair of pins 15 (FIG. 2) which are supported on a bracket 16. The latter, in turn, is fixed to a stationary frame 17 (FIG. 1). Two coil springs 18 (FIG. 2) are telescoped over the pins and lightly urge the magnet toward the armature 12.

More specifically, the electromagnet 10 comprises a flat plate 20 (FIG. 2) made of a malleable, low reluctance material such as steel. In the present instance, the plate is inexpensively formed as a single-piece stamping from a sheet of steel and is formed with two outboard holes 21 spaced equidistantly from a center hole 22. The plate is generally oblong or oval and has somewhat of a shallow V-shaped configuration.

A relatively large diameter cylindrical stud 23 is telescoped into and is secured within the center hole 22 while two smaller diameter cylindrical studs 24 are telescoped into and are fixed within the outboard holes 21. The studs may be made quickly and easily on an automatic screw machine from round bar stock such as steel or other low reluctance material. Each stud is formed with a reduced diameter end portion which is fixed within the hole in the plate 20 by virtue of a light press fit or by brazing, bonding or staking. The studs 24 are tubular and are adapted to receive the mounting pins 15. The springs 18 which are telescoped over the mounting pins are compressed between the bracket 16 and the plate 20.

Telescoped over the two outboard studs 24 and supported on the plate 20 are two electrical coils 26 (FIG. 2) for producing magnetic flux. Each coil is of conventional circular construction and includes an annular bobbin 27 which supports a multiple turn winding 28 having lead wires 29 (FIG. 3) adapted to be connected to the voltage source.

When the coils 26 are excited by the voltage source, the center stud 23 forms a magnetic pole of one polarity while the two outboard studs 24 form magnetic poles of the opposite polarity. Magnetic flux threads two paths with each path extending from an outboard stud 24, across to the armature 12, reversely across to the center stud 23 and then back to the outboard stud by way of the plate 20.

In accordance with the present invention, the electromagnet 10 is equipped with a unique friction face 30 which is relatively inexpensive and which may be easily removed and replaced when wear occurs. In carrying out the invention, the friction face 30 is formed by a relatively thin sheet 31 of friction material (i.e., material similar to brake lining) and by low reluctance inserts 33 and 34 which are joined to the friction material and which form pole faces for the stud 23 and the studs 24, respectively.

More specifically, the friction material 31 is shaped the same as the plate 20 and is formed with a center hole 35 (FIG. 2) and with two outboard holes 36 which are alined with the stud 23 and the studs 24, respectively. The insert 33 is in the form of a cylindrical steel disc which is secured in the hole 35 either by a press fit or by molding the friction material 31 around the insert. Both of the inserts 34 are secured in the holes 36 in a similar manner and are in the form of tubular steel discs so as to be capable of receiving the pins 15 if necessary. The diameter of each insert 33, 34 is just slightly less than the diameter of the associated stud 23, 24. Each insert is magnetically isolated from each of the other inserts by the friction material 31.

Pursuant to the invention, means are provided for preventing the friction face 30 from shifting edgewise and angularly relative to the studs 23 and 24. Herein, these means comprise keys in the form of cylindrical rings 40 (FIG. 2). The studs 24 and the inserts 34 are formed with opposing annular grooves 41 and 42, respectively, which define a keyway for receiving the rings with a relatively tight fit. When inserted into the grooves 41 and 42, the rings 40 prevent the friction face 30 from shifting edgewise relative to the studs and also prevent the friction face from turning.

The electromagnet 10 is completed by a tubular housing 50 made of aluminum or other heat conductive material. The housing has the same peripheral shape as the plate 20 and the friction face 30, is sandwiched between the plate and the friction face and is cemented to the plate. Heat-radiating fins 51 are formed on the outer side of the housing.

When the electromagnet 10 is used in conjunction with a tension brake 11, the friction face 30 continuously engages the armature 12, even when the magnet is de-energized, and thus the armature prevents the friction face from separating axially from the studs 23 and 24. The rings 40 prevent the friction face from shifting edgewise and angularly relative to the studs and thus hold the friction face in a stationary position.

After the friction material 31 and the inserts 33 and 34 have experienced excessive wear, the entire friction face 30 may be simply slipped off of the rings 40 and replaced with a new friction face (see FIG. 4). Thus, it is not necessary to discard the entire electromagnet 10 when the friction face becomes worn.

The housing 50 acts as a radiator to dissipate heat from the coils 26 and, in addition, serves to occupy the space between the plate 20 and the friction material 31. As a result, that space need not be filled up with friction material and thus a relatively thin and inexpensive sheet 31 of friction material may be used. Because the sheet 31 is thin, its heat insulating characteristics are relatively low so as to enable better dissipation of heat from the coils.

By virtue of the rings 40, both faces of the friction material 31 and both faces of each of the inserts 33 and 34 may be ground flat and planar by a relatively simple parallel grinding set up. Also, the ends of the studs 23 and 24 can be ground flat and planar after the studs have been assembled with the plate 20. Such grinding assures against the existence of air gaps between the studs and the inserts 33 and 34 and enables the active faces of the inserts and the friction material 31 to be disposed parallel to the armature 12.

When the electromagnet 10 is used with a stopping brake rather than a tension brake, the friction face 30 separates axially from the armature when the magnet is de-energized. When the electromagnet is so used, screws (not shown) may be used to connect the friction face 30 to the housing 50 and prevent the friction face from separating axially from the housing upon de-energization of the magnet.

Figure 6:
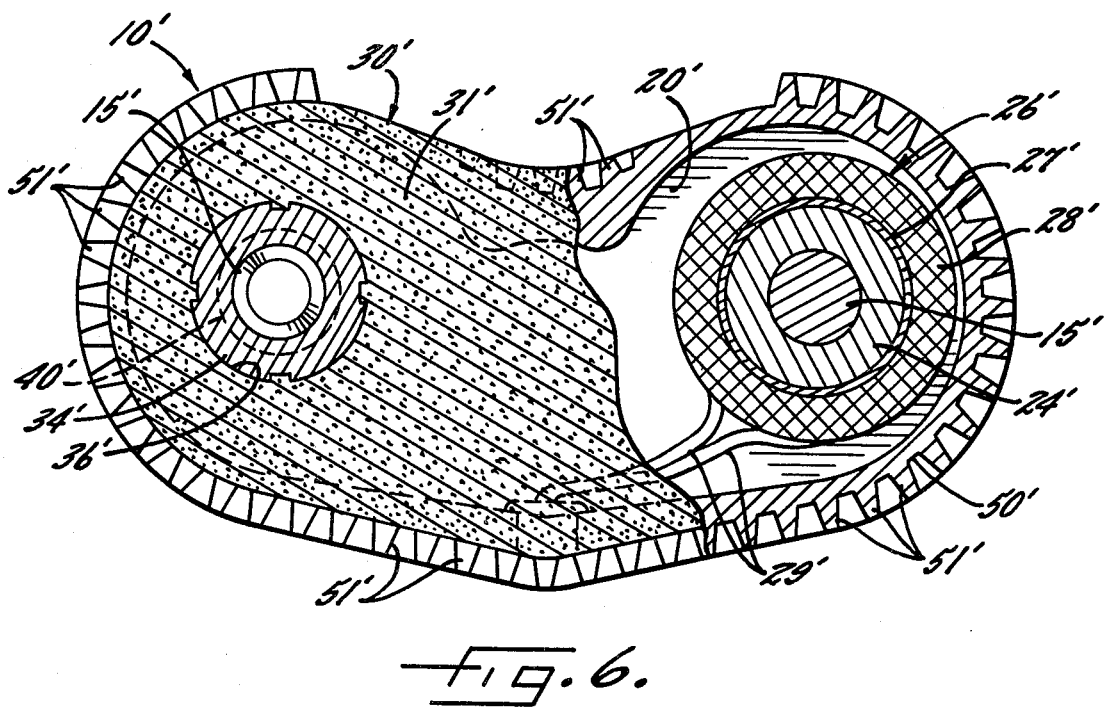
FIG. 6 is a cross-section taken substantially along the line 6—6 of FIG. 5.

Another embodiment of a magnet 10' incorporating the features of the invention is shown in FIGS. 5 and 6 in which parts corresponding to parts of the magnet 10 have been indicated by the same but primed reference numerals. Themagnet 10' is identical to the magnet 10 except that a coil 26' is telescoped over only one of the studs 24' (herein, the right stud). In addition, the magnet 10' does not include a center stud and center insert corresponding to the stud 23 and the insert 33 of the magnet 10 but instead the plate 20' and the friction sheet 31' are solid across those areas where the plate 20 and the sheet 31 of the magnet 10 are formed with holes 22 and 35, respectively. In the magnet 10', one of the inserts 34' defines a pole face of one polarity while the other insert 24' defines a pole face of opposite polarity.

We claim:

1. An electromagnet for use with a brake or the like, said electromagnet comprising a plate made of low reluctance magnetic material, a stud made of low reluctance magnetic material and connected to said plate, said stud extending outwardly from and being disposed substantially perpendicular to said plate, an annular coil telescoped over said stud and having means adapted for connection to a voltage source, said stud defining a magnetic pole of one polarity when said coil is excited by said voltage source, means made of low reluctance magnetic material and extending from said plate in the same direction as said stud, said means being connected to said plate and defining a magnetic pole of opposite polarity when said coil is excited, the improvement in said electromagnet comprising, a sheet of friction material having parallel inner and outer faces and having holes extending between said faces, inserts made of low reluctance magnetic material fixed within said holes and having ends which are substantially flush with the faces of said friction material, said inserts being disposed in alinement with said poles and having outer ends defining pole faces, alined keyways formed in the outer end of said stud and in the inner end of one of said inserts, and a key inserted in said keyways and operable to restrict edgewise bodily movement of said friction material relative to said stud.

2. An electromagnet as defined in claim 1 in which said keyways comprise concentric annular grooves formed in the outer end of said stud and in the inner end of said one insert, said key comprising a ring located within said grooves.

3. An electromagnet as defined in either of claims 1 or 2 further including a tubular housing made of heat conductive material and sandwiched between said plate and said friction material, said housing extending around the peripheral margins of said plate and being secured to said plate.

4. An electromagnet for use with a brake or the like, said electromagnet comprising a plate made of low reluctance magnetic material, a stud made of low reluctance magnetic material and connected to said plate, said stud extending outwardly from and being disposed substantially perpendicular to said plate, an annular coil telescoped over said stud and having means adapted for connection to a voltage source, said stud defining a magnetic pole of one polarity when said coil is excited by said voltage source, means made of low reluctance magnetic material and extending from said plate in the same direction as said stud, said means being connected to said plate and defining a magnetic pole of opposite polarity when said coil is excited, the improvement in said electromagnet comprising, a sheet of friction material having parallel inner and outer faces and having holes extending between said faces, inserts made of low reluctance magnetic material fixed within said holes and having ends which are substantially flush with the faces of said friction material, said inserts being disposed in alinement with said poles and having outer ends defining pole faces, means for restricting edgewise movement of said friction material relative to said stud, and a tubular housing made of heat conductive material and sandwiched between said plate and said friction material, said housing extending around the peripheral margins of said plate and being secured to said plate.

5. An electromagnet as defined in claim 4 in which heat radiating fins are formed on the outboard side of said housing.

6. An electromagnet for use with a brake or the like, said electromagnet comprising a plate made of low reluctance magnetic material, three spaced openings formed in said plate, three studs made of low reluctance magnetic material and fixed within said openings, said studs extending outwardly from and being disposed substantially perpendicular to said plate and having outer ends which are disposed in a common plane, two of said studs being outboard studs and being located on opposite sides of the third stud, and annular coils telescoped over said outboard studs and each having means adapted for connection to a voltage source, the improvement in said electromagnet comprising, a sheet of friction material having parallel inner and outer faces and having holes coaxial with said studs and extending between said faces, inserts made of low reluctance magnetic material fixed within said holes and having ends which are substantially flush with the faces of said friction material, the inner ends of said inserts being disposed in end-to-end engagement with the outer ends of said studs, and means restricting said friction material from shifting edgewise relative to said studs.

7. An electromagnet as defined in claim 6 in which said last-mentioned means comprise annular grooves formed in the outer end of each outboard stud and in the inner end of the opposing insert, and a ring located in each pair of opposing grooves.

8. An electromagnet as defined in either of claims 6 or 7 further including a tubular housing made of heat conductive material and sandwiched between said plate and said friction material, said housing extending around the peripheral margins of said plate and being secured to said plate.

9. A friction face for an electromagnet adapted for use with a brake or the like, said friction face comprising a sheet of friction material having parallel faces, a plurality of spaced holes formed in said friction material and extending between said faces, and inserts made of low reluctance magnetic material fixed securely within said holes and having ends which are substantially flush with the faces of said friction material.

10. A friction face as defined in claim 9 in which an annular groove is formed in one end of at least one of said inserts.

11. A friction face as defined in claim 10 in which said one insert is tubular.

12. An electromagnet for use with a brake or the like, said electromagnet comprising a plate made of low reluctance magnetic material, a stud made of low reluctance magnetic material and connected to said plate, said stud extending outwardly from and being disposed substantially perpendicular to said plate, an annular coil telescoped over said stud and having means adapted for connection to a voltage source, said stud defining a magnetic pole of one polarity when said coil is excited by said voltage source, means made of low reluctance magnetic material and extending from said plate in the same direction as said stud, said means being connected to said plate and defining a magnetic pole of opposite polarity when said coil is excited, the improvement in said electromagnet comprising a replaceable friction face including a sheet of friction material having parallel inner and outer faces and having holes extending between said faces, said replaceable friction face further including inserts made of low reluctance magnetic material fixed within said holes and having ends which are substantially flush with the faces of said friction material, said inserts being disposed in alinement with said poles and having outer ends defining pole faces, and means for restricting edgewise movement of said friction material relative to said plate and said poles.

* * * * *